Patented Jan. 15, 1924.

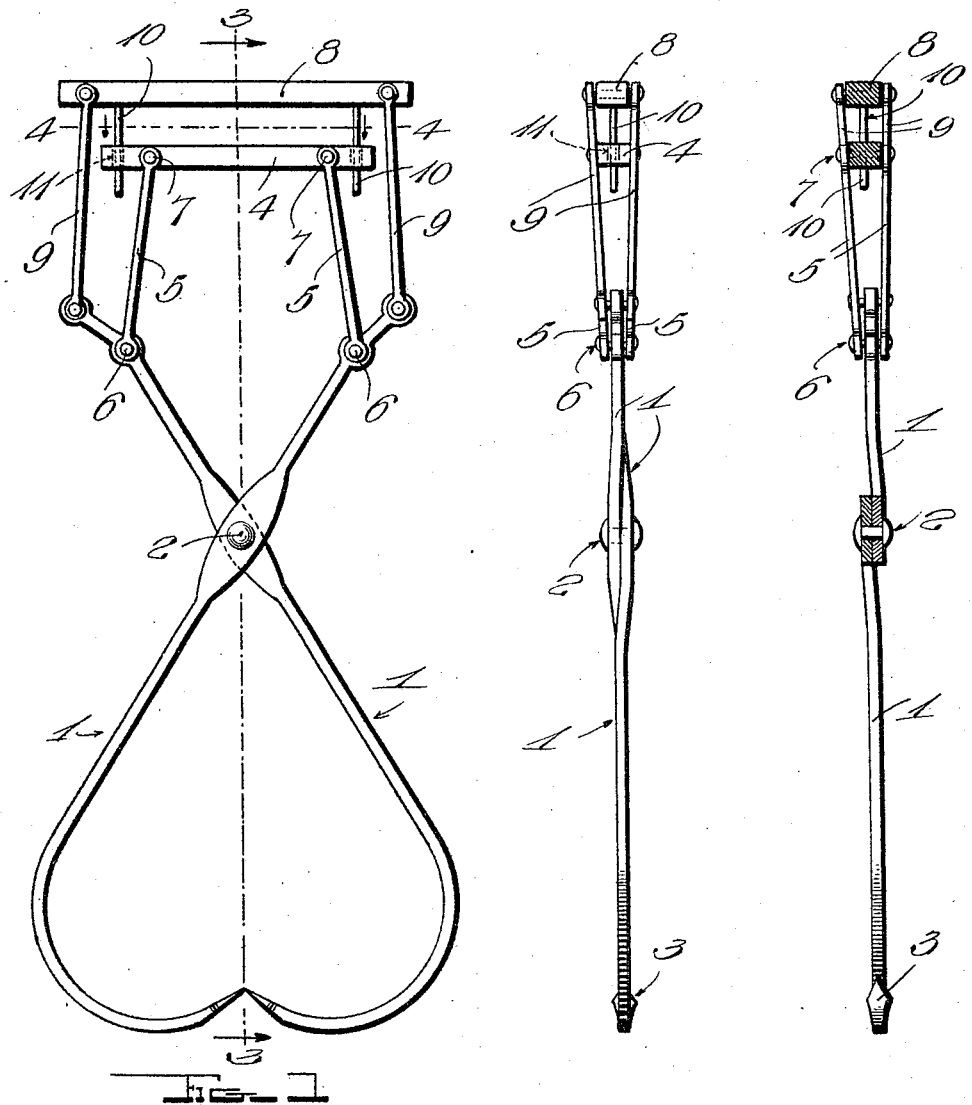

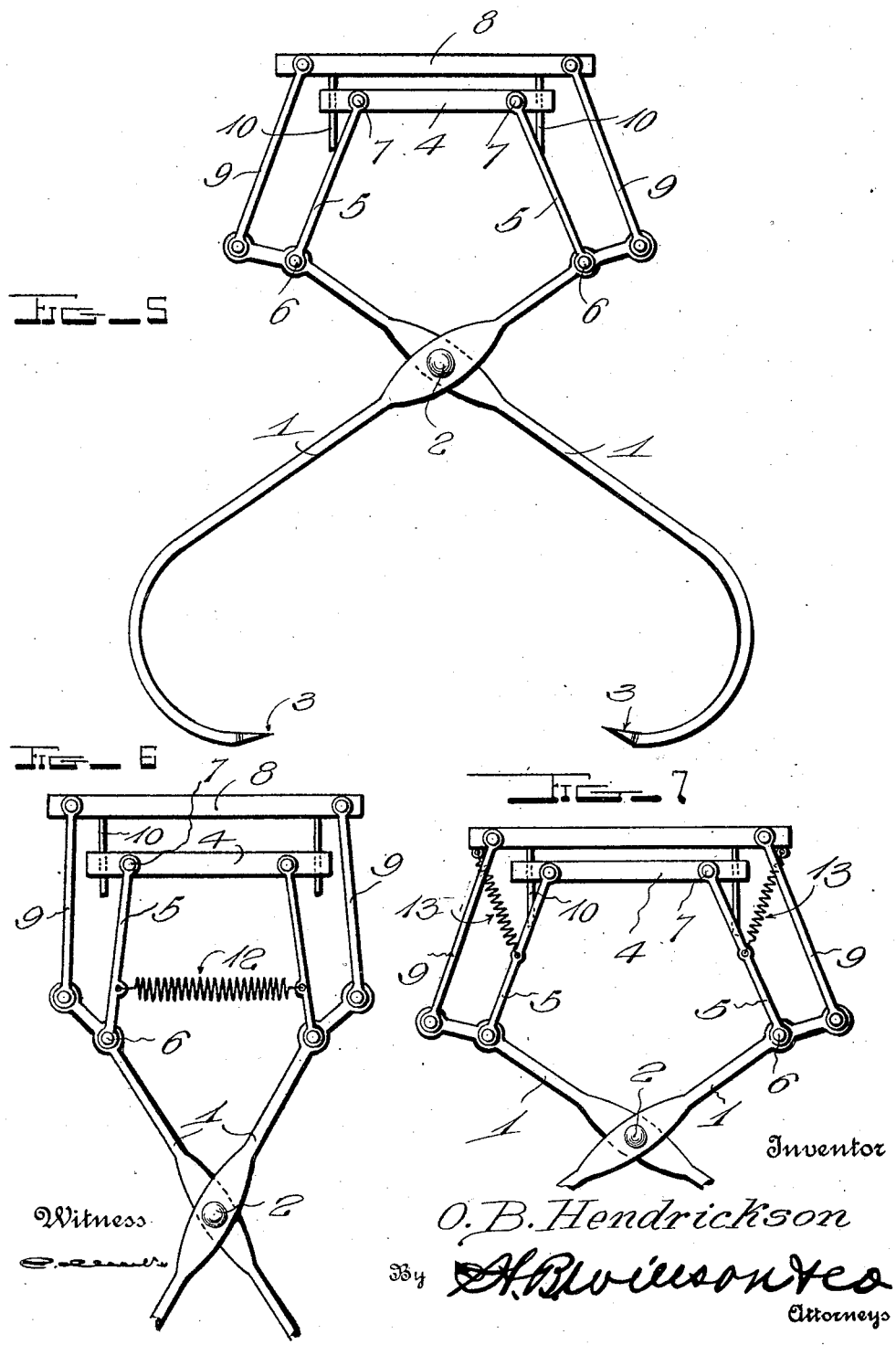

1,480,820

UNITED STATES PATENT OFFICE.

OLIVER B. HENDRICKSON, OF BOYNTON, OKLAHOMA, ASSIGNOR OF ONE-HALF TO JOHN McLEMORE, OF HASKELL, OKLAHOMA.

ICE TONGS.

Application filed November 2, 1922. Serial No. 598,633.

*To all whom it may concern:*

Be it known that I, OLIVER B. HENDRICKSON, a citizen of the United States, residing at Boynton, in the county of Muskogee and State of Oklahoma, have invented certain new and useful Improvements in Ice Tongs; and I do declare the following to be a full, clear, and exact description of the invention, such as will enable others skilled in the art to which it appertains to make and use the same.

My invention relates to improvements in tongs and has reference more particularly to ice tongs, the object being to provide a simple and inexpensive, yet a highly efficient and reliable arrangment of parts whereby the tongs may be opened or closed, merely by manipulating their handles with one hand.

With the foregoing in view, the invention resides in the novel subject matter hereinafter described and claimed, the description being supplemented by the accompanying drawing.

Figure 1 is a side elevation of a pair of ice tongs constructed in accordance with my invention.

Figure 2 is an edge view.

Figure 3 is a vertical section on line 3—3 of Fig. 1.

Figure 4 is a horizontal sectional view as indicated by line 4—4 of Fig. 1.

Figure 5 is a view similar to Fig. 1 but illustrating the tongs opened instead of closed.

Figure 6 is a partial side elevation similar to Fig. 1 but showing the addition of a spring which assists in closing the tongs.

Figure 7 is a fragmentary side elevation similar to Fig. 5 but showing the addition of springs which assist in opening the tongs.

In the drawing above briefly described, the numerals 1 designate a pair of crossed levers which are pivoted together between their ends at 2 and provided at their lower ends with ice-engaging hooks 3. A carrying handle 4 of horizontally elongated form, is disposed above the levers 1 and is connected with the upper end portions thereof by chains, straight links or any other suitable linkage, straight links being shown, as indicated by the numerals 5. The lower ends of these links 5 are pivoted to the levers 1 at points spaced downwardly from their free upper ends, as indicated by the numerals 6, while the upper ends of said links 5 are pivoted at 7 to the handle 4 at points spaced inwardly from the ends of said handle.

Spaced above and parallel with the carrying handle, is a tong-closing handle 8 which is preferably of greater length than said handle 4, the ends of the handle 8 being connected with the levers 1 at points above the pivots 6, by tong-opening links 9 which are preferably of the form shown.

One of the handles carries guiding means for the other and in the present instance, this guiding means consists of a pair of depending pins 10 carried by the handle 8 and received loosely in openings 11 in the ends of the handle 4. It will be understood however that other suitable guides may be employed if desired.

By employing the construction shown, it will be seen that by gripping both handles 4 and 8 with one hand and moving them toward each other, the levers 1 are swung upwardly about the pivots 6 as fulcrums, thereby opening the tongs as shown for instance in Fig. 5 so that they may be properly engaged with the ice. Then the load, while the ice is being carried, is supported upon the handle 4 which holds the tongs closed in the usual manner.

If the tongs are of rather light construction and will not readily close by gravity, the links 5 may well be connected by a tension spring 12 as indicated in Fig. 6, said spring having a tendency to draw the upper ends of the levers 1 toward each other, thereby closing the lower ends of the tongs.

If the tongs are of exceptionally heavy construction, and cannot easily be opened by moving one handle toward the other, coil tension springs 13 may connect the ends of the handle 8 with the links 5 to assist in the opening operation, as shown in Fig. 7.

As excellent results may be obtained from the details disclosed, they are preferably followed, but within the scope of the invention as claimed, numerous minor changes may be made.

I claim:

1. A pair of tongs comprising a pair of crossed levers pivoted together, a carrying handle, linkage connecting the ends of said carrying handle to said levers above their pivot, a tong-opening handle above said carrying handle, and tong-opening linkage extending from the ends of said tong-opening handle and pivoted to said levers above the aforesaid linkage.

2. A pair of tongs comprising a pair of crossed levers pivoted together, a carrying handle, linkage connecting the ends of said handle with said levers above the pivot points of the latter, a tong-opening handle above said carrying handle, tong-opening linkage extending from the ends of said tong-opening handle and pivoted to said levers above the aforesaid linkage, and guide pins carried by one handle and extending through openings in the other handle.

In testimony whereof I have hereunto affixed my signature.

OLIVER B. HENDRICKSON.